United States Patent [19]

Finkle

[11] Patent Number: 4,652,845
[45] Date of Patent: Mar. 24, 1987

[54] MAGNETIC HOLDING DEVICE
[75] Inventor: Louis J. Finkle, Bellflower, Calif.
[73] Assignee: Larry K. Goodman, Cerritos, Calif.
[21] Appl. No.: 888,566
[22] Filed: Jul. 22, 1986

Related U.S. Application Data

[63] Continuation-in-part of Ser. No. 788,014, Oct. 16, 1985.
[51] Int. Cl.⁴ .............................................. H01F 7/20
[52] U.S. Cl. ..................................... 335/285; 335/295; 294/65.5
[58] Field of Search .............. 335/285, 295, 286, 287; 294/65.5, 81.2, 81.62

[56] References Cited

U.S. PATENT DOCUMENTS 3,051,875  8/1962  Farwell .................. 335/285
3,363,209  1/1968  Pevar ................... 335/295 X
3,968,986  7/1976  Nagata ................. 294/65.5

Primary Examiner—George Harris
Attorney, Agent, or Firm—Donald D. Mon

[57] ABSTRACT

A magnetic holding device to be mounted to a magnetizable surface. It includes a body and a magnet having a pair of poles. A first and a second pole piece are mounted to the body adjacent to the magnet, each forming a continuation of a respective one of the poles. Each pole piece is a plurality of elongated magnetizable members in side to side sliding relationship to one another. They project from the body, and their projection is adjustable and selectable by sliding them. Releasable compression means allows for their relative movement when released, and holds them in an adjusted position when set. As optional features, the pole pieces can be magnetized or not, such as by the use an electromagnet or rotatable magnet, and the compression means may be a cam.

19 Claims, 11 Drawing Figures

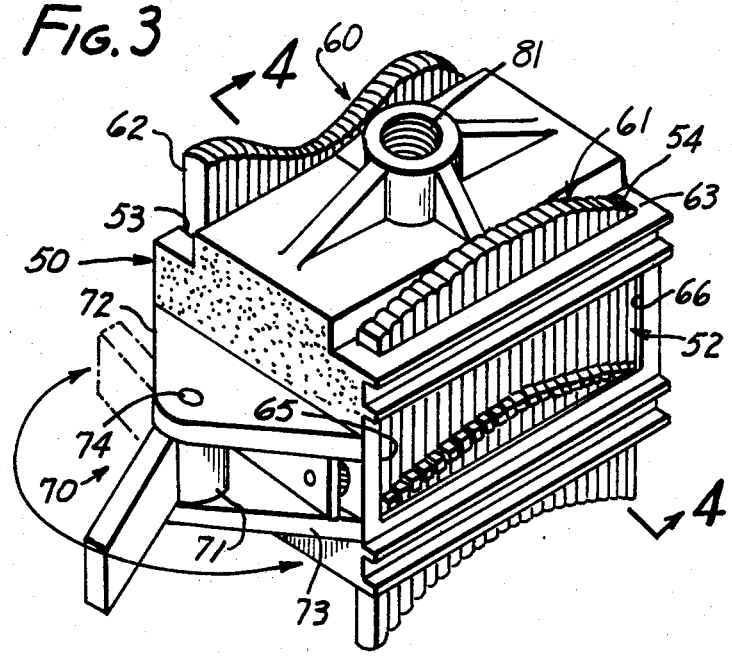
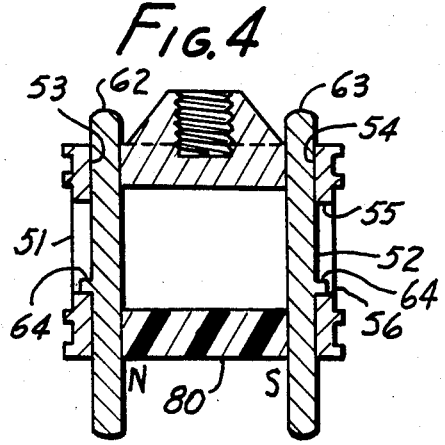
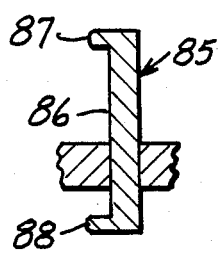
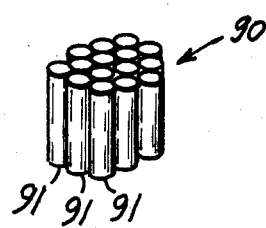
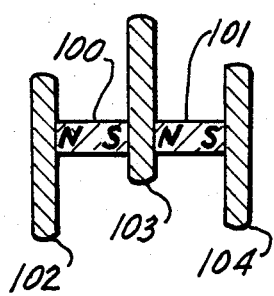
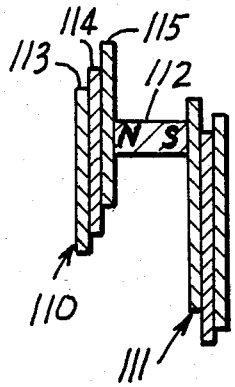
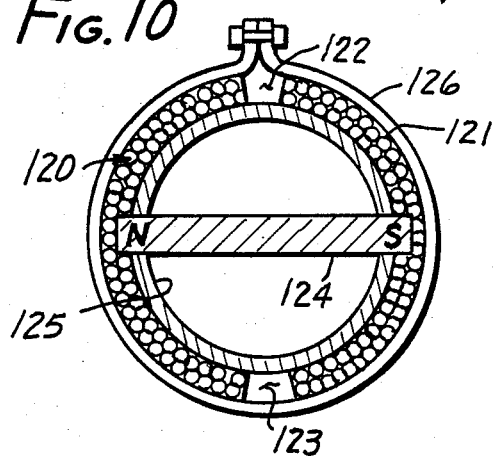
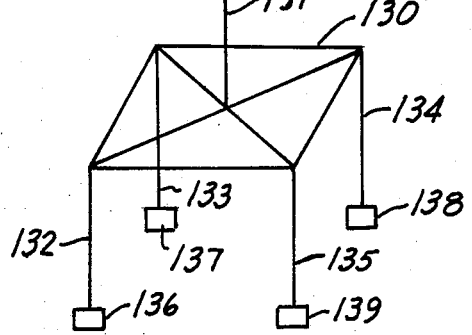

MAGNETIC HOLDING DEVICE

CROSS-REFERENCE TO OTHER PATENT APPLICATION

This is a continuation-in-part of applicant's co-pending United States patent application, Ser. No. 788,014, filed Oct. 16, 1985, entitled "Realeasable Magnetic Holding Device".

FIELD OF THE INVENTION

This invention relates to a holding device which is detachably magnetically attachable to a magnetizable surface, and in particular to such a holder which is universally adaptable so it can be attached to an irregular surface and placed in a variety of alignments relative thereto.

BACKGROUND OF THE INVENTION

Detachable magnetic holding devices are known such as from Levesque Patent No. 2,280,437, in which a rotatable permanent magnet assembly causes a pair of pole plates selectively to be magnetized or not magnetized, thereby selectively to attach or release the device relative to a magnetizable surface. This device has the inherent disadvantage that it can be attached only to a flat or prismatic surface.

An interesting attempt to adapt to a complex surface is shown in Walpole Pat. No. 1,171,818, in which pole plates of appropriate and different lengths are embedded in a structure so as to bear against electromagnetic poles at one end and against an irregularly shaped workpiece at the other. But this construction is a one-shot device suitable for only one shape. It is a single purpose construction, and is not an adaptable construction for accommodating to various shapes, one after another.

Yet another magnetic holding device is shown in Nagata Pat. No. 3,968,986, issued July 13, 1976. The Nagata device includes a series of adjacent electromagnets, each of which has a pair of poles that are rigidly fixed to one another. With this arrangement it is possible that only one pole piece at a time can contact the work. Unless the work is flat or prismatic the magnetic circuit is broken where one pole piece is spaced from the work because the other has made first contact. The device is therefore less effective.

It is an object of this invention to provide a simple and elegant magnetic holding device which can adapt to complex surfaces, making a completed magnetic circuit at both pole pieces, which relative to any surface can be aligned in various orientations.

BRIEF DESCRIPTION OF THE INVENTION

A magnetic holder according to this invention includes a pair of pole pieces adapted to contact work to which the holder is to be attached. Magnet means is interposed between the pole pieces.

Each pole piece comprises a plurality of aligned, adjacent magnetizable members, which are slidable relative to one another, so their ends can all be brought into contact with the workpiece, however complex its surface configuration might be. Compression means releasably holds the magnetizable members in the adjusted position.

Magnet means is interposed between the pole pieces to magnetize them. According to a preferred but optional feature of the invention, the magnet means includes a rotatable permanent magnet. When the magnet is turned so its poles do not face the pole pieces, the pole pieces are not magnetized, and the holder can readily be removed (detached) from the surface. When the magnet is turned so the magnet is aligned with the pole pieces, the pole pieces are magnetized and magnetically hold to the work. The device is still releasable in the sense of being detachable in this condition, merely by overpowering the magnetic force, but it is more convenient to remove the force instead, by turning the magnet.

In a less convenient embodiment, the magnet is always in place and in alignment with the pole pieces. Release of the device from the work is accomplished merely by pulling it off. The sliding adjustability of the pole pieces is not affected by the presence or absence of the effect of the magnet.

The pole pieces may have various configurations, including arcuate, and a plurality of these holders may be joined for more complicated tasks.

The above and other features of this invention will be fully understood from the following detailed description and the accompanying drawings in which.

BRIEF DESCRIPTION OF THE DRAWINGS

FIG. 3 is a perspective view of another embodiment of the invention;

FIG. 4 is a section taken at line 4—4 in FIG. 3;

FIG. 5 is a fragmentary view of compression means in FIG. 3;

FIG. 6 shows another means to retain elongated members in the pole pieces.

FIG. 7 illustrates another type of elongated member useful in the pole pieces.

FIG. 8 is a perspective view showing the use of multiple pole pieces.

FIG. 9 is a schematic end view showing the use of multiple stacks of elongated members in individual pole pieces.

FIG. 10 is a partially schematic top view showing another configuration of pole pieces; and FIG. 11 is a schematic view showing a use of a plurality of holders.

DETAILED DESCRIPTION OF THE INVENTION

Figure 1:
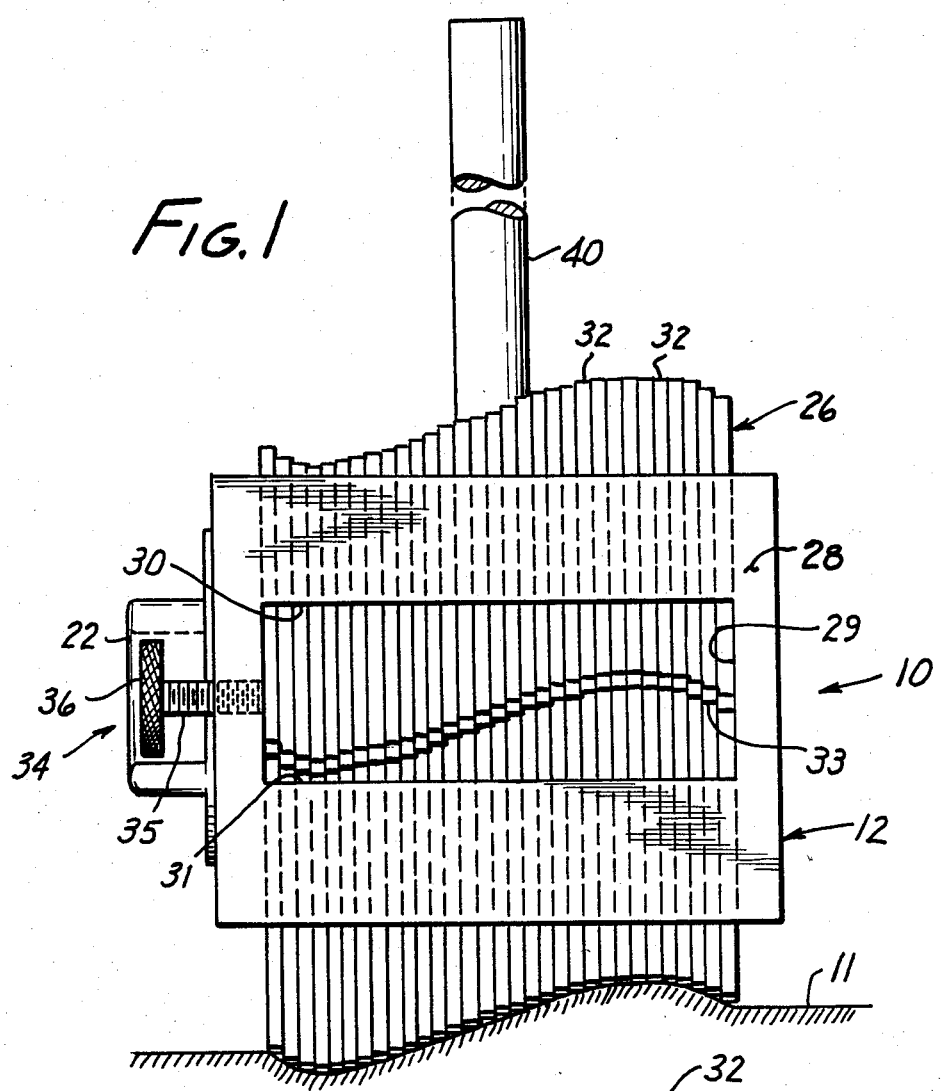
FIG. 1 is a side view of the presently preferred embodiment of the invention.

The ultimate objective of this invention is stably to enable a magnetic holding device 10 according to the invention to be attached to a magnetizable surface 11 ("work"). For convenience in disclosure surface 11 is shown as curved and complex. It may instead be planar, prismatic, or even spherical. The presently preferred embodiment, shown in FIGS. 1 and 2, comprises a body 12 having a pair of armature sections 13,14. The armature sections 13 and 14 are made of magnetizable material and are separated by a pair of non-magnetic sections 15,16. Sections 13–16 extend axially from left to right in FIG. 1.

A rotatable pole piece 20 is mounted in a passage 21 in the body. It includes a permanent magnet having a north pole and south pole identified as N and S, respectively throughout this specification. A handle 22 is provided to rotate the pole piece. This is a well-known construction that is shown in Levesque Pat. No. 2,280,437. This patent is incorporated herein by reference for a showing of such a device.

The body also holds a pair of pole pieces 25,26 mounted in the body, one on each side of the armature sections and forming a continuing magnetic path therewith. Both of the pole pieces are identical so that only pole piece 26 will be described in detail. It fits in a slot 27 through the device, the slot being formed in part by a side plate 28. The side plate has a window 29 therethrough with an upper edge 30 and a lower edge 31 respectively.

Pole piece 26 comprises a plurality of elongated magnetizable members (sometimes called "blades"). Their cross-section is arbitrary. It is more convenient to form them as flat blades as shown. Any uniform cross-section for these members is acceptable because the members must merely be slidable relative to one another. Prismatic sections are best because they provide the maximum total cross-section of metal for a given total cross-section. Circular sections do not because there will be voids between them. Members 32 are formed of magnetizable material, each of which has a laterally projecting stud 33 projecting into the window between the said window edges. These studs and the edges of the window are complementary retaining means which prevent the blades from falling out of the body.

Figure 2:
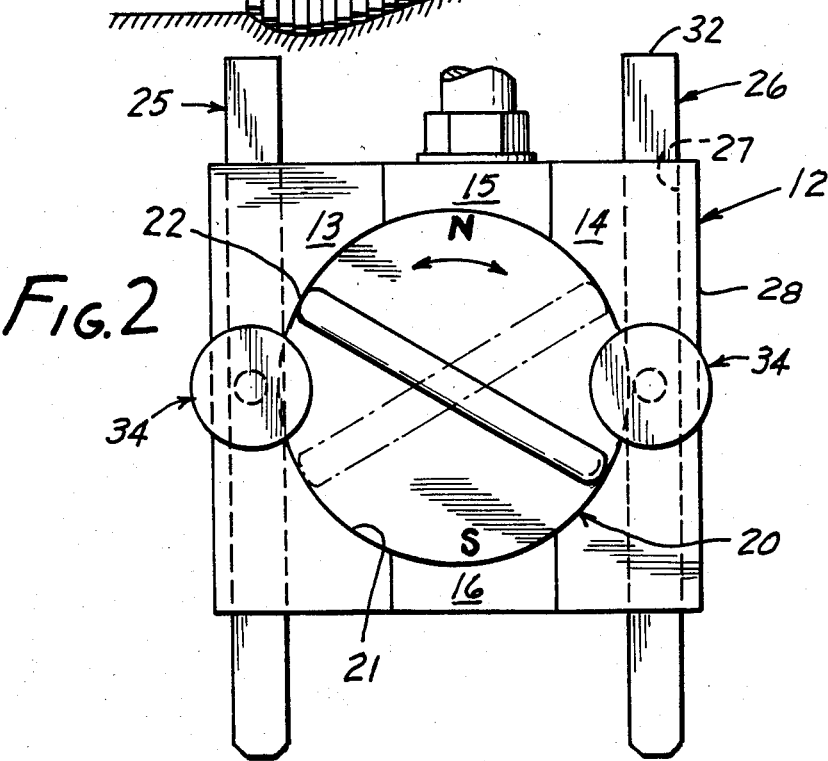
FIG. 2 is a left-hand view of FIG. 1

Together the blades form a stack which is adapted to be held in an adjusted position by compression means 34. In this case the compressive means is a screw 35 with a knurled head 36 that can be turned to compress the blades against one another so as to hold them in an adjusted position when desired, and to be released so that they can slide freely to adapt to a surface with which the device is to conform. The term "stack" is not limited to an orderly group of flat or prismatic blades as shown in FIG. 1. Any uniform cross-section is acceptable, because the members must only be slidable relative to each other.

Members 32 are formed of magnetizable material, each of which has a laterally-extending stud 33 projecting therefrom extending into the window between the said window edges. These studs and the edges of the window prevent the blades from falling out of the body.

A shaft 40 to which tools or other devices can be attached is mounted to the body and extends therefrom.

When the north and south poles are aligned with the nonmagnetic sections (non-magnetic sections being made of a material such as aluminum), then there is no complete magnetic path between the pole pieces and the device will not be attracted to the surface. When they are aligned, the magnetic path will be complete, and attraction will result.

FIG. 3 and 4 show a somewhat less convenient device, but one which is still quite useful. It has a body 50 of non-magnetic material such as aluminum. Side windows 51,52 are formed in opposite sides of the body, which enter into respective slots 53 and 54. Each side is identical, so only window 52 and slot 54 will be described in detail.

Upper edge 55 and lower edge 56 extend parallel to one another.

Groups 60,61 of elongated magnetizable elements 62,63 are placed in respective slots. They are of such length that they will project below the body even when in their uppermost position. As in FIG. 1, these elements are flat blades, each with a stud 64 that limits the sliding movement of the element by engaging the edges. End walls 65,66 bound the slot to hold the stack in place.

Compression means 70 comprises a cam 71 that is pivotally mounted between plates 72,73 that project from the body. A hinge pin 74 mounts the cam. The cam has a riser position 75, (FIG. 5) at one side of a handle 76, and a recessed portion 77 angularly spaced from it. Turning the cam to the position shown in FIG. 5 will exert a compressive action. In turn, this compressive action is exerted on a floating compression plate 77a that bears against pins 78, 79. The pins pass through the body to bear against the ends of each pole piece. When the cam is turned to force the riser against the plate, a compressive force is exerted on the stack that holds the elements in their adjusted position. When the handle is turned so the recessed portion 77 faces the plate, the compressive force is released. The dimensions of the device are such the elements can then slide relative to each other, and relative to the base.

Inside the base, and contiguous to each pole piece, is a permanent magnet 80 (FIG. 4). It extends the full length of the pole pieces, and in this embodiment is not rotatable or otherwise movable. The pole pieces are always magnetized. However, the device is still releasable from the work merely by overcoming the magnetic force at the tips of the pole pieces by "stripping" off the device.

The base may conveniently be provided with means for attaching other parts to it such as posts, for example. In FIGS. 3 and 4 there is shown an internally threaded socket 81 for this purpose. A post can be threaded into it. This is exemplary of a wide variety of useful arrangements for this purpose.

FIG. 6 illustrates another embodiment for an elongated e)ement 85 used as part of a pole piece. It has a central linear portion 86 and a pair of ends 87,88. The flanged ends may be made by bending the flanged ends as shown. This can dispense with side windows and studs in the mid-portion. Also, this configuration is especially convenient when circular or nonprismatic elements are used.

In FIG. 7 there is shown a group 90 of individual elements 91 brought together into a stack. These may be placed in the slots already described, and may be provided with studs in their mid-portion, or may be bent at their ends as in FIG. 7. The illustrated cross-section is circular, although any other elongated shape could be used instead. This FIG. shows that the stack need not be orderly as in FIG. 1, but may be a randomly packed group, so long as a compressive force will press them into continuity so as to prevent the relative sliding movement when compressed. In this group it takes more than one of the elements to bridge across the slot.

FIG. 8 is a semi-schematic showing of a larger-area embodiment which includes more than two pole pieces. For convenience in disclosure, the body and compression means are not shown. A pair of permanent magnets 100,101, having their poles opposed as shown, are placed between pole pieces 102,103 and 104. Each pole piece is comprised of a compressible stack of elongated elements. Pole pieces 102 and 104 are of opposite polarity from pole piece 103. The arrangement provides three instead of two pole pieces. It could if desired be further extended to include additional pole pieces.

FIG. 9 is an extension of the concept of FIG. 7. As shown, pole pieces 110,111 are on opposite sides of permanent magnet 112. Each pole piece comprises three orderly stacks (of the type shown in Fig. 1), 113,114,115 in side by side contact. Thus, each pole piece itself is more conformable to a complex surface.

FIG. 10 illustrates that the pole pieces are not limited to straight linear stacks. Instead they may be curved or otherwise shaped. FIG. 10 is a top view in which pole pieces 120, 121 are nearly semi-cylindrical. Gaps 122, 123 extend axially to separate them. A permanent magnet 124 is placed between them. If desired it can be made rotatable to provide an off-on magnetic action as in the device of FIG. 1. In fact, the rotatable feature of FIG. 1 can be incorporated into any embodiment of this invention.

The pole pieces may be assembled around a central non-magnetic tube 125 (slotted to permit the magnet to contact the pole pieces). A hose clamp type compression means 126 surrounds the pole pieces, which when tightened packs the elements closely together against tube 125 to prevent their relative sliding movement. When loosened, the elements can slide relative to each other and to the body. The pole pieces may be longitudinally extended rods or wires as desired.

FIG. 11 schematically shows an expanded use of this device, especially useful when a body is to be lifted by it. Although the primary intended use is as a holder for the purpose of mounting something such as a gauge or dial indicator, within the range of its holding capacity the device can also or instead be used as a lifter. In FIG. 11, a frame 130, which itself is supported by a lifting cable 131, supports four cables 132, 133, 134 and 135, each of which is connected to a respective device 136, 137, 138, 139 according to any embodiment of the invention. Thus, the lifting capacity of any embodiment can be multiplied by a larger number of them connected together.

It will also be recognized that an electromagnet may be substituted for a permanent magnet in any embodiment, and the term "magnet" means either type.

In use, the stack compression means are loosened and the device is placed with its body in its desired alignment and location. Then the compression means are applied to compress the stack and hold them in alignment. If the permanent magnet is fixed, the device is now "mounted". If the magnet is rotatable, or is an electromagnet, the rotor is turned, or the current is applied, and the device will be "mounted". To release the device from the surface, either the magnetic force is mechanically overcome, or the magnetism is released by turning the rotor or stopping the current, as appropriate.

It will be recognized that not only can the device be attached to complex surfaces with the body in an upright orientation, but also, whether the surface is plain or complex, within the limits of the device the body can be moved around to any desired orientation relative to the horizontal or vertical and in this sense it is universally adjustable.

This device thereby provides an elegantly simply construction for use as holder or lifter. For example, during inspection procedures it can support gauges or dial indicators. It can readily be adapted to non-planar and planar surfaces with the body and the holding shaft, if one is provided, held at a desired orientation relative to any axis. For lifting purposes it offers the optimum in complete magnetic circuits to and through the work.

This invention is not to be limited by the embodiments shown in the drawings and described in the description which are given by way of example and not of limitation, but only accordance with the scope of the appended claims.

I claim:

1. A magnetic holding device adapted to be mounted to a magnetizable surface, comprising:
   a body;
   a magnet having a pair of poles mounted to said body;
   a first pole piece and a second pole piece mounted to said body adjacent to said magnet, each forming a continuation of a respective one of said poles, each pole piece comprising a group of a plurality of elongated magnetizable members in side to side relationship to one another, all of said magnetizable members extending generally parallel to one another, projecting from said body, and being slidable relative to each other and to said body unless the group is compressed to prevent it, whereby to be individually movable to project beyond said body by an adjustable and selectible distance in the absence of such compression; and
   compression means adapted to compress said group to hold said elongated magnetizable members in an adjusted position until the compression means releases the compression.

2. Apparatus according to claim 1 in which said elongated magnetizable members are flat plates.

3. Apparatus according to claim 1 in which said compression means is a screw.

4. Apparatus according to claim 1 in which the elongated magnetizable members and body include complementary retention means to prevent the said members from falling out of the body.

5. Apparatus according to claim 1 in which mounting means is attached to said body for receiving and supporting an object.

6. Apparatus according to claim 5 in which said mounting means is a post.

7. Apparatus according to claim 1 in which said magnet is a permanent magnet.

8. Apparatus according to claim 1 in which said magnet is an electromagnet, and in which means is provided to energize said electromagnet.

9. Apparatus according to claim 1 in which the elongated magnetizable members have a non-rectangular cross-section, and abut in such a way that the width of the pole piece is occupied by more than one said member.

10. Apparatus according to claim 9 in which the said cross-section is circular.

11. Apparatus according to claim 4 in which said retention means includes a lateral projection from said elongated magnetizable member.

12. Apparatus according to claim 1 in which said pole pieces extend linearly.

13. Apparatus according to claim 1 in which pole pieces are non-linear.

14. Apparatus according to claim 1 in which there are more than two of said pole pieces, and in which magnet means is disposed between each pair of adjacent pole pieces, the polarity of said pole pieces alternating from each one to the next one.

15. Apparatus according to claim 1 in which each pole piece comprises a plurality of orderly stacks of flat plates in contiguity with one another.

16. Apparatus according to claim 1 in which said compression means is a cam.

17. Apparatus according to claim 1 in which frame means supports a plurality of said holding devices for simultaneous lifting response.

18. A magnetic holding device mountable to a magnetizable surface, comprising:

a body having a first and second armature section; a first and second non-magnetic section joining and separating said armature sections, there being a rotor passage through said body bounded by said alternate armature and a non-magnetic sections, said armature sections being on opposite sides thereof;

a rotor rotatably fitted in said rotor passage, said rotor having an axis of rotation, and extending axially and angularly, a north and a south magnetic pole, said poles being disposed so as to be aligned with the non-magnetic sections in one angular position of said rotor, and aligned with said armature sections in another angular position of said rotor;

a first pole piece and a second pole piece mounted to said first and second armature sections, respectively, said pole pieces being spaced apart from one another, and comprising a plurality of elongated magnetizable members in side by side relationship to one another, and projecting from said body, said members being slidable relative to each other and to said body, whereby to be individually movable to project beyond said body by an adjustable and selectible distance; and compression means adapted releasably and mechanically to hold the said elongated magnetizable member in an adjusted position.

19. Apparatus according to claim 18 in which said elongated magnetizable members are flat plates.

* * * * *